(12) United States Patent
Pfeiffer et al.

(10) Patent No.: US 8,008,370 B2
(45) Date of Patent: Aug. 30, 2011

(54) COATING MATERIALS CONTAINING PARTICLES WITH PROTECTED ISOCYANATE GROUPS

(75) Inventors: Juergen Pfeiffer, Burghausen (DE); Volker Stanjek, Munich (DE); Torsten Gottschalk-Gaudig, Mehring (DE)

(73) Assignee: Wacker Chemie AG, Munich (DE)

( * ) Notice: Subject to any disclaimer, the term of this patent is extended or adjusted under 35 U.S.C. 154(b) by 438 days.

(21) Appl. No.: 11/815,817

(22) PCT Filed: Feb. 2, 2006

(86) PCT No.: PCT/EP2006/000925
§ 371 (c)(1),
(2), (4) Date: Aug. 8, 2007

(87) PCT Pub. No.: WO2006/084629
PCT Pub. Date: Aug. 17, 2006

(65) Prior Publication Data
US 2008/0262169 A1    Oct. 23, 2008

(30) Foreign Application Priority Data

Feb. 10, 2005  (DE) .......................... 10 2005 006 187
Jun. 9, 2005   (DE) .......................... 10 2005 026 699

(51) Int. Cl.
*C08K 9/06*     (2006.01)
(52) U.S. Cl. .......................... 523/209; 525/457; 525/474
(58) Field of Classification Search .................. 525/474, 525/457; 523/209
See application file for complete search history.

(56) References Cited

U.S. PATENT DOCUMENTS

| | | | | |
|---|---|---|---|---|
| 4,062,825 A | * | 12/1977 | Watabe et al. | 524/847 |
| 4,439,593 A | * | 3/1984 | Kelso et al. | 528/45 |
| 4,623,740 A | | 11/1986 | Deschler et al. | |
| 4,697,009 A | | 9/1987 | Deschler et al. | |
| 4,719,267 A | * | 1/1988 | Rizk et al. | 525/453 |
| 5,998,504 A | * | 12/1999 | Groth et al. | 523/213 |
| 6,630,211 B1 | | 10/2003 | Baumgart et al. | |
| 6,649,672 B1 | | 11/2003 | Ducoffre et al. | |
| 6,750,270 B1 | * | 6/2004 | Klostermann et al. | 523/200 |
| 2003/0008974 A1 | | 1/2003 | Mehnert et al. | |
| 2006/0020097 A1 | | 1/2006 | Briehn et al. | |
| 2006/0041035 A1 | * | 2/2006 | Poppe et al. | 523/200 |

FOREIGN PATENT DOCUMENTS

| | | |
|---|---|---|
| EP | 0410264 A1 | 1/1991 |
| EP | 0832947 A2 | 4/1998 |
| JP | 51050351 A | 5/1976 |
| WO | WO 0050523 A1 | 8/2000 |
| WO | WO 0075244 A1 | 12/2000 |
| WO | WO 0105897 A1 | 1/2001 |
| WO | WO 2004035649 A1 * | 4/2004 |
| WO | WO 2004089961 A1 | 10/2004 |

OTHER PUBLICATIONS

Patent Abstract of PCT corresponding to WO 0316370 A.
Patent Abstract of PCT corresponding to WO 06018144 A.
Patent Abstract of Japan corresponding to JP 08291186 A.
Patent Abstract of Japan corresponding to JP 10067787 A.
Hermann Bach et al., Absenkung der Einbrenntemperaturen bei 1K-PUR Systemen, Farbe & Lack 109, 32-42, 2003 (=D6).

* cited by examiner

*Primary Examiner* — Margaret G Moore
(74) *Attorney, Agent, or Firm* — Brooks Kushman P.C.

(57) ABSTRACT

Coating formulations especially useful for topcoat and clearcoat applications contains an isocyanate-reactive resin, a blocked isocyanate curative, and particles which bear blocked isocyanate functionalities, a considerable portion of which unblock at a temperature lower than the unblocking temperature of the curative. As a result, the coatings exhibit improved scratch resistance.

22 Claims, No Drawings

COATING MATERIALS CONTAINING PARTICLES WITH PROTECTED ISOCYANATE GROUPS

CROSS-REFERENCE TO RELATED APPLICATION

This application is the U.S. national phase of PCT Appln. No. PCT/EP2006/000925 filed Feb. 2, 2006, which claims priority to German application numbers 10 2005 006 187.7 filed Feb. 10, 2005 and 10 2005 026 699.1 filed Jun. 9, 2005.

BACKGROUND OF THE INVENTION

1. Field of the Invention

The invention relates to coating formulations, more particularly topcoat and clearcoat materials, which comprise particles which on their surface have protected isocyanate groups.

2. Description of the Related Art

Coating systems comprising particles—more particularly nanoparticles—are state of the art. Such coatings are described for example in EP 1 249 470 or WO 03/16370. The particles in these coatings lead to an improvement in the properties of the coatings, more particularly with regard to their scratch resistance and also their chemical resistance.

A frequently occurring problem associated with the use of the—generally inorganic—particles in organic coating systems consists in a usually inadequate compatibility between particle and coating-material matrix. This can lead to the particles being insufficiently dispersible in the matrix. Moreover, even well-dispersed particles may undergo settling in the course of prolonged standing or storage times, with the formation, possibly, of larger aggregates or agglomerates, which even on redispersion are then impossible or difficult to separate into the original particles. The processing of such inhomogeneous systems is extremely difficult in any case, and in fact is often impossible. Coating materials which, once applied and cured, possess smooth surfaces are generally preparable by this route not at all or only at great cost.

Favorable, therefore, is the use of particles which on their surface possess organic groups that lead to improved compatibility with the coating-material matrix. In this way the inorganic particle becomes "masked" by an organic shell. Particularly favorable coating-material properties can be achieved in this context if, furthermore, the organic functions on the particle surfaces also possess groups that are reactive toward the coating-material matrix, so that under the respective curing conditions of the coating material in question they are able to react with the matrix. In this way, success is achieved in incorporating the particles into the matrix chemically in the course of coating-material curing, which often may result in particularly good mechanical properties but also result in improved chemical resistance. Systems of this kind are described for example in DE 102 47 359 A1, EP 832 947 A or EP 0 872 500 A1.

Also known, furthermore, is the use of coatings comprising a binder which has been modified with nanoparticles. These coatings can be produced by reacting the particles, equipped with a reactive functionality, with a binder containing a complementary reactive functionality. In this case, therefore, the organofunctional particle is incorporated chemically into the coating-material matrix not only at the coating-material curing stage but also even at the binder preparation stage. Systems of this kind are described for example in EP 1 187 885 A or WO 01/05897.

In the case of one particularly important type of coating material, a film-forming resin is used which comprises hydroxy-functional prepolymers which, on curing of the coating material, are reacted with an isocyanate-functional curative. These polyurethane coating materials are notable for particularly good properties, such as a superior chemical resistance, for example, yet there is still a need for improvement in particular as regards the scratch resistance of these systems. Typically they are used in particularly high-value and demanding fields of application: for example, as clearcoat and/or topcoat materials for OEM paint systems in the automobile and vehicle industry. The majority of refinish coating materials, for automobile repairs, are also composed of isocyanate-curing systems of this kind.

Typically a distinction is made between two different polyurethane coating systems, known as 2K and 1K systems. The former consist of two components, one of which is composed essentially of the isocyanate curative, while the film-forming resin with its isocyanate-reactive groups is contained in the second component. The two components must be stored and transported separately and should not be mixed until shortly before they are processed, since the potlife of the completed mixture is greatly limited. Often more favorable, therefore, are the so-called 1K systems, composed of just one component, in which alongside the film-forming resin there is a curative containing protected isocyanate groups. 1K coating materials are cured thermally, the protective groups of the isocyanate units being eliminated, with the deprotected isocyanates being able then to react with the film-forming resin. Typical baking temperatures of such 1K coating materials are situated at 130-160° C.

In the case of these high-value coating materials a further improvement in properties would be desirable. This is true in particular of vehicle finishes. For instance, the achievable scratch resistance of conventional autofinishes, in particular, is still not sufficient, with the consequence, for example, that particles in the washwater in a carwash lead to significant marring of the finish. Over time, this causes lasting damage to the gloss of the finish. In this situation, formulations that allow higher scratch resistances to be achieved would be desirable.

One particularly advantageous way of achieving this objective is to use particles having protected isocyanate functions on their surface. Where such particles are incorporated into 1K polyurethane coating materials, the isocyanate functions on the particle surfaces are liberated as well in the course of coating-material curing, and the particle is incorporated chemically into the finish. Moreover, the protected isocyanate functions enhance compatibility between particle and coating-material matrix.

Particles of this kind containing protected isocyanate functions are in principle already known. Typically they are prepared by condensing particles having free silicon or metal hydroxide functions with alkoxysilyl-functional organosilicon compounds whose organic radical contains protected isocyanate functions. Organosilicon compounds of this kind containing masked isocyanate groups have already been described, as in DE 34 24 534 A1, EP 0 212 058 B1, JP 08-291186 or JP 10-067787, for example. The particles containing protected isocyanate functions themselves, and their use in coatings, are described in EP 872 500 A, for example.

The scratch resistance of coatings can in fact be increased significantly through the incorporation of such particles. However, in all of the methods of using these particles that have been described in the prior art, optimum results have still not been achieved.

SUMMARY OF THE INVENTION

DETAILED DESCRIPTION OF THE PREFERRED EMBODIMENT(S)

It was an object of the invention, therefore, to provide a coating which comprises particles that on their surface possess protected NCO groups, the intention being that this coating should feature further-improved properties, more particularly a further-improved scratch resistance.

The invention provides coating formulations (B1) comprising
a) 20-90% by weight, based on the solids fraction, of a film-forming resin (L) containing reactive groups,
b) 1-90% by weight, based on the solids fraction, of a coating curative (H) possessing reactive functions with which, for paint curing, it reacts on thermal treatment with the reactive groups of the film-forming resin (L), c) 0.1-40% by weight, based on the solids fraction, of particles (P) which comprise a core composed of atoms selected from metal atoms, silicon atoms, and oxygen atoms, or of silicone resins,
  the particles (P) possessing on their surface at least one protected isocyanate group which on thermal treatment eliminates a protective group to release an isocyanate function, more than 50% of the protected isocyanate groups bearing protective groups whose elimination temperature is below the temperature of the reaction of the functional groups of the film-forming resin (L) with those of the curative (H),
d) 0-90% by weight, based on the overall coating formulation (B1), of a solvent or a solvent mixture, and
e) if desired, further coating components and additives.

The solids fraction here encompasses those components of the coating material which, when the latter is cured, remain within the coating material.

Typical elimination temperatures of the isocyanate-protective groups of the particles (P), and also the reaction temperature of the functional groups of film-forming resin (L) and curative (H), may in general be obtained from the relevant literature known to the skilled worker. Furthermore, they may also be determined by means of standard techniques such as, for example, differential scanning calorimetry (DSC) or, if the functional groups are protected isocyanate functions, by means of thermogravimetry (TG). These measurement techniques are state of the art and are known to the skilled worker.

Insofar as the difference between the elimination temperature of the isocyanate-protective groups of the particles (P) and also the reaction temperature of the functional groups of film-forming resin (L) and curative (H) cannot be clearly derived from literature data, these features are defined for the purposes of this invention as follows: the elimination temperature of the isocyanate-protective groups is the temperature at which the rate of elimination of the protective groups—measured by means of DSC or TG with a heating rate of 1° C./min—attains a maximum. The reaction temperature of the functional groups of the film-forming resin (L) with those of the curative (H) is defined as being the temperature at which—employing the same measurement method—the rate of reaction between the two reactants attains a maximum.

If the particles (P) in this context are prepared by the process described below from particles (P1) and hydrolyzable organosilanes (A) which containing at least one protected isocyanate function, then the elimination temperature of the protected isocyanate functions of the particles (P) is determined not by measuring the particles (P) themselves but instead by measuring the silane precursor (A). This technique is advantageous on account of the fact that the particles (P) are often difficult, if not impossible, to isolate, being stable only in the dissolved state.

If film-forming resin (L) and/or curative (H) in this context each have two or more functional groups differing in their reactivity, i.e., if on coating-material curing there are different reactions between film-forming resin (L) and curative (H), with different reaction temperatures in each case, then the definitions above refer to the reaction which is predominant quantitatively (i.e. in mol % of the reactive functions involved in the reaction in question) during thermal coating-material curing. Preference is given to coating formulations (B1) comprising particles (P) at least 70%, with particular preference at least 90%, more particularly 100% of whose protected isocyanate groups bear protective groups whose elimination temperature is below the temperature of the reaction of the functional groups of the film-forming resin (L) with those of the curative (H). In one preferred embodiment of the invention the coating formulations (B1) comprise hydroxy-functional film-forming resins.

Preference is further given to coating formulations (B1) whose coating curative (H) comprises a melamine-formaldehyde resin. Particularly preferred, however, are those coating formulations (B2) which comprise a coating curative (H) which—like the particles (P)—possesses protected isocyanate groups which on thermal treatment eliminate a protective group to release an isocyanate function. In the case of this preferred embodiment of the invention the reaction temperature between film-forming resin, (L) and curative (H) is defined as being identical with the elimination temperature of the protective groups of the curative (H). This is sensible, since the NCO groups released by the elimination of the protective groups normally continue reaction immediately with the film-forming resin.

Thus, a preferred subject of the invention are coating formulations (B1) comprising
a) 20-90% by weight, based on the solids fraction, of a hydroxyl-functional film-forming resin (L),
b) 1-90% by weight, based on the solids fraction, of a coating curative (H) which contains protected isocyanate groups which on thermal treatment eliminate a protective group to release an isocyanate function,
c) 0.1-40% by weight, based on the solids fraction, of particles (P) comprising a core composed of atoms selected from metal atoms, silicon atoms, and oxygen atoms, or of silicone resins,
  the particles (P) possessing on their surface at least one protected isocyanate group which on thermal treatment eliminates a protective group to release an isocyanate function, more than 50% of the protected isocyanate groups bearing protective groups which have a lower elimination temperature than 60% of the protective groups of the protected isocyanate groups of the curative (H),
d) 0-90% by weight, based on the overall coating formulation (B1), of a solvent or a solvent mixture, and
e) if desired, further coating components and additives.

In this case preferably at least 70%, with particular preference at least 90%, of the protected NCO groups of the particles (P) bear protective groups which have a lower elimination temperature than 60%, preferably 70%, with particular preference 90% of the protective groups of the protected isocyanate groups of the curative (H). With particular preference the protective groups of all the protected isocyanate groups of the particles (P) in the coating formulations (B1) have a lower elimination temperature than all of the protective groups of the protected isocyanate groups of the curative (H).

The elimination temperatures of protective groups of curative (H) and particles (P) are preferably taken from the literature—which is known to the skilled worker. In case of doubt, however, they can be determined by the technique described above.

In one preferred method of determining the elimination temperature the temperature found is that which is at least necessary for at least 80% of the protective groups of the type in question to be eliminated within 30 minutes, with release of free isocyanate functions. This elimination temperature can be determined, for example, by thermogravimetric methods.

If the particles (P) in this context are prepared by the process described below from particles (P1) and hydrolyzable organosilanes (A) which contain at least one protected isocyanate function, then the elimination temperature of the protected isocyanate functions of the particles (P) is determined not by measuring the particles (P) themselves but instead by measuring the silane precursor (A). This technique is advantageous on account of the fact that the particles (P) are often difficult, if not impossible, to isolate, being stable only in the dissolved state.

The invention is based on the finding that the coatings produced from the coating formulations (B1) of the invention in which the protective groups of the protected isocyanate functions of the particles (P) possess, on a majority basis, an elimination temperature below the reaction temperature of film-forming resin (L) and curative (H) exhibit better scratch resistances than corresponding coatings which do not meet this condition. This is true in particular of coating formulations (P1) which in addition to the particles (P) comprise a hydroxy-functional film-forming resin (L) and the curative (H) which, like the particles (P), possesses protected isocyanate groups. Here, the coating formulations (B1) of the invention in which the protective groups of the particles, at least on a majority basis, possess a lower elimination temperature than the (majority of the) isocyanate functions of the curative exhibit significantly better scratch resistances than noninventive coatings in which the protective groups of particles and curative are identical. Responsible for this effect is the fact that, in the course of coating-material curing, the coatings (B1) of the invention allow improved chemical incorporation of the particles (P) into the coating-material matrix.

The invention further provides coating formulations (B2) comprising
a) 20-90% by weight, based on the solids fraction, of a film-forming resin (L) containing reactive groups,
b) 1-90% by weight, based on the solids fraction, of a coating curative (H) possessing reactive functions with which, for paint curing, it reacts on thermal treatment with the reactive groups of the film-forming resin (L),
c) 0.1-40% by weight, based on the solids fraction, of particles (P) which comprise a core composed of atoms selected from metal atoms, silicon atoms, and oxygen atoms, or of silicone resins, the particles (P) possessing on their surface at least one protected isocyanate group which on thermal treatment eliminates a protective group to release an isocyanate function, more than 50% of the protected isocyanate groups of the particles (P) bearing protective groups which have a lower elimination temperature than butane oxime,
d) 0-90% by weight, based on the overall coating formulation (B2), of a solvent or a solvent mixture, and
e) if desired, further coating components and additives.

Preference is given here to coating formulations (B2) comprising particles (P) at least 70%, with particular preference at least 90%, of whose protected isocyanate groups bear protective groups which have a lower elimination temperature than butane oxime. With particular preference the protective groups of all the protected isocyanate groups of the particles (P) in the coating formulations (B2) have a lower elimination temperature than butane oxime.

Preference is given here to coating formulations (B2) which comprise particles (P) at least 50%, preferably at least 70% or 90%, of whose protected isocyanate groups, with particular preference 100%, have been protected with diisopropylamine, 3,5-dimethylpyrazole or 2-isopropylimidazole.

In one preferred embodiment of the invention the coating formulations (B2) comprise hydroxy-functional film-forming resins (L).

Preference is given, furthermore, to coating formulations (B2) whose coating curative (H) comprises a melamine-formaldehyde resin. Particularly preferred, however, are coating formulations (B2) which comprise a coating curative (H) which, like the particles (P), possesses protected isocyanate groups which on thermal treatment eliminate a protective group to release an isocyanate function.

Thus, particular preference is given to coating formulations (B2) comprising
a) 20-90% by weight, based on the solids fraction, of a hydroxyl-functional film-forming resin (L),
b) 1-90% by weight, based on the solids fraction, of a coating curative (H) which contains protected isocyanate groups which on thermal treatment eliminate a protective group to release an isocyanate function,
c) 0.1-40 by weight, based on the solids fraction, of particles (P) comprising a core composed of atoms selected from metal atoms, silicon atoms, and oxygen atoms, or of silicone resins,
the particles (P) possessing on their surface at least one protected isocyanate group which on thermal treatment eliminates a protective group to release an isocyanate function, more than 50% of the protected isocyanate groups of the particles (P) bearing protective groups which have a lower elimination temperature than butane oxime,
d) 0-90% by weight, based on the overall coating formulation (B2), of a solvent or a solvent mixture, and
e) if desired, further coating components and additives.

In one preferred embodiment of the invention the coating formulations (B1) or (B2) comprise
a) 30-80% by weight, based on the solids fraction, of a film-forming resin (L),
b) 10-60% by weight, based on the solids fraction, of a coating curative (H),
c) 0.5-30% by weight, based on the solids fraction, of particles (P), comprising a core composed of atoms selected from metal atoms, silicon atoms, and oxygen atoms, or of silicone resins,
the particles (P) possessing on their surface at least one protected isocyanate group which on thermal treatment eliminates a protective group to release an isocyanate function,
d) 0-80% by weight, based on the overall coating formulation (B1) or (B2), of one or more solvents, and
e) if desired, further coating components and additives.

With particular preference the coating formulations (B1) or (B2) comprise
a) 40-70% by weight, based on the solids fraction, of a film-forming resin (L),
b) 15-50% by weight, based on the solids fraction, of a coating curative (H),
c) 1-25% by weight, based on the solids fraction, of particles (P), d) 20-70% by weight, based on the overall coating formulation (B1) or (B2), of one or more solvents, and
e) if desired, further coating components and additives.

With particular preference the fraction of the solvent or solvents as a proportion of the overall coating formulations (B1) or (B2) is 30% to 60% by weight, more particularly 35% to 60% by weight.

In one preferred embodiment of the invention the particles (P) are obtainable by reacting particles (P1) composed of atoms selected from metal atoms, silicon atoms, and oxygen atoms, or of silicone resins, and possessing free hydroxyl functions, with organosilanes (A) which
a) possess at least one hydrolyzable silyl function or else at least one hydroxysilyl group, and which
b) contain at least one protected isocyanate function.

In one particularly preferred embodiment of the invention silanes (A) of the general formula (I)

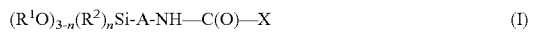
(I)

are used where
$R^1$ denotes hydrogen, alkyl radical, cycloalkyl radical or aryl radical having in each case 1 to 6 C atoms, it being possible for the carbon chain to be interrupted by nonadjacent oxygen, sulfur or $NR^3$ groups,
$R^2$ denotes alkyl radical, cycloalkyl radical, aryl radical or arylalkyl radical having in each case 1 to 12 C atoms, it being possible for the carbon chain to be interrupted by nonadjacent oxygen, sulfur or $NR^3$ groups,
$R^3$ denotes hydrogen, alkyl radical, cycloalkyl radical, aryl radical, arylalkyl radical, aminoalkyl radical or aspartate ester radical,
X denotes a protective group which is eliminated at temperatures of 60 to 300° C. in the form of HX, and releases an isocyanate function in the process,
A represents a difunctional alkyl radical, cycloalkyl radical or aryl radical having 1-10 carbon atoms, and
n can adopt the values 0, 1 or 2.

The group $R^1$ is preferably a methyl or ethyl radical. The group $R^2$ is preferably a methyl, ethyl, isopropyl or phenyl radical. $R^3$ has preferably not more than 10 carbon atoms, more particularly not more than 4 carbon atoms. A represents preferably a $(CH_2)_3$ group and with particular preference a $CH_2$ group.

The preferred elimination temperatures of the protective groups, more particularly HX, are 80 to 200° C., with particular preference 100 to 170° C. Protective groups HX used may be secondary or tertiary alcohols, such as isopropanol or tert-butanol, CH-acidic compounds such as diethyl malonate, acetylacetone, ethyl acetoacetate, oximes such as formaldoxime, acetaldoxime, butane oxime, cycohexanone oxime, acetophenone oxime, benzophenone oxime or diethylene glyoxime, lactams, such as caprolactam, valerolactam, butyrolactam, phenols such as phenol, o-methylphenol, N-alkyl amides such as N-methylacetamide, imides such as phthalimide, secondary amines such as diisopropylamine, imidazole, 2-isopropylimidazole, pyrazole, 3,5-dimethylpyrazole, 1,2,4-triazole and 2,5-dimethyl-1,2,4-triazole, for example. Preference is given to using protective groups such as butane oxime, 3,5-dimethylpyrazole, caprolactam, diethyl malonate, dimethyl malonate, ethyl acetoacetate, diisopropylamine, pyrrolidone, 1,2,4-triazole, imidazole and 2-isopropylimidazole. Particular preference is given to using protective groups which allow a low baking temperature, such as diethyl malonate, dimethyl malonate, butane oxime, diisopropylamine, 3,5-dimethylpyrazole and 2-isopropylimidazole, for example.

In the case of a further embodiment of the invention the particles (P) are prepared by reaction of OH-functional particles (P1) with organosilanes (A) of the general formula (II)

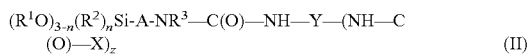
(II)

where
$R^1, R^2, R^3$, A, X and n are as defined for the general formula (I),
Y represents a (z+1)-functional aliphatic or aromatic radical, and
z denotes a number from 1-4, preferably 1 or 2.

The reaction between the particles (P1) and the organosilanes (A) takes place preferably directly when the reactants are mixed. A particular advantage in this context is to use silanes (A) of the general formula (I) or (II) in which the spacer A is a $CH_2$ bridge, since a feature of these silanes (A) is a particularly high reactivity toward the hydroxyl groups of particles (P1), so that the functionalization of the particles with these silanes can be carried out particularly quickly and at low temperatures, more particularly even at room temperature. The particles (P1) may be functionalized either as a dispersion in an aqueous or else anhydrous protic or aprotic solvent, or in the solid state. In the latter case the mixing may take place, for example, in a fluidized-bed reactor or in other known mixing devices, such as plowshare mixers, for example.

Where silanes (A) of the general formula (I) or (II) are used that only possess monoalkoxysilyl functions (i.e., silanes of the general formula (I) or (II) with n=2), there is no need to add water during the preparation of the particles (P), since the monoalkoxysilyl groups are able to react directly with the hydroxyl functions on the surface of the particles (P1). If, on the other hand, silanes (A) with di- or trialkoxysilyl groups are used (i.e., silanes of the general formulae (I) or (II) with n=0 or 1), then the addition of water during the preparation of the particles (P) is often advantageous, since in that case the alkoxysilanes are able to react not only with the Si—OH functions of the particles (P1) but also—following their hydrolysis—with one another. This produces particles (P) which possess a shell composed of inter-crosslinked silanes (A).

In the preparation of the particles (P) it is possible to carry out the surface modification using not only the silanes (A) but also any desired mixtures of the silanes (A) with other silanes (S1), silazanes (S2) or siloxanes (S3). The silanes (S1) possess either hydroxysilyl groups or else hydrolyzable silyl functions, the latter being preferred. These silanes may additionally possess further organic functions, although silanes (S1) without further organic functions can also be used.

Particular preference is given to using mixtures of silanes (A) with silanes (S1) of the general formula (III)

(III)

where
$R^1$, $R^2$ and $R^3$ are as defined for the general formula (I), and
$R^4$ radicals denote identical or different SiC-bonded hydrocarbon radicals having 1 to 18 carbon atoms, substituted if desired by halogen atoms, amino groups, ether groups, ester groups, epoxy groups, mercapto groups, cyano groups, isocyanate groups, methacrylic groups or (poly) glycol radicals, the latter being composed of oxyethylene and/or oxypropylene units,
a denotes 0, 1, 2 or 3, and
b denotes 0, 1, 2 or 3.

Here a is preferably 0, 1 or 2, while b is preferably 0 or 1.

Silazanes (S2) and/or siloxanes (S3) used are with particular preference hexamethylsilazane and/or hexamethyldisiloxane.

Particles (P1) which can be used are all metal oxide particles and mixed metal oxide particles (e.g., aluminum oxides such as corundum, mixed aluminum oxides with other metals and/or silicon, titanium oxides, zirconium oxides, iron oxides), silicon oxide particles (e.g., fumed silica, precipitated silica, colloidal silica) or silicon oxide compounds in which some of the valences of the silicon carry organic radicals, i.e., silicone resins. These particles (P1) are notable for the fact that on their surface they possess metal hydroxide and/or silicon hydroxide functions via which a reaction with the organosilanes (A)—and also, where appropriate, with the silanes (S1), silazanes (S2) or siloxanes (S3)—can take place. The particles (P1) preferably possess an average diameter of 1 nm to 100 μm, more preferably of 10 nm to 200 nm.

In one preferred embodiment of the invention the particles (P1) are composed of fumed silica, prepared in a pyrogenic reaction from silicon compounds, such as from silicon tetrachloride or methyldichlorosilane, or hydrogentrichlorosilane or hydrogenmethyldichlorosilane, or other methylchlorosilanes or alkylchlorosilanes, both as they are and in a mixture with hydrocarbons, or any desired volatilizable or sprayable mixtures of organosilicon compounds.

It is possible to use silicas prepared by a wet-chemical route or prepared at high temperature (greater than >1000° C.). Particular preference is given to pyrogenically prepared silicas. It is possible to use hydrophilic and hydrophobicized silicas.

It is also possible to use mixtures of different metal oxides or silicas, examples being mixtures of metal oxides or silicas with different BET surface areas, or mixtures of silicas with different degrees of hydrophobicization or silylation.

The operation of surface modification is preferably composed of three individual steps: (1) the loading of the silica with the silane, (2) the reaction, (3) the purification of the silica to remove excess silane and/or by-products or cleavage products.

The surface treatment is preferably carried out in an atmosphere that does not lead to the oxidation of the silylated silica, i.e., preferably less than 10% by volume oxygen, with particular preference less than 2.5% by volume, the best results being achieved at less than 1% by volume oxygen.

Coating, reaction, and purification can be carried out as a discontinuous or continuous operation. For technical reasons a continuous reaction regime is preferred.

Coating takes place preferably at temperatures of −30-150° C., preferably 20-100° C.; with particular preference the coating step takes place at 30-50° C.

The residence time is 1 min-24 h, preferably 15 min to 240 min, and with particular preference, for reasons of the space-time yield, 15 min to 90 min.

The pressure in the coating operation ranges from a slight underpressure of down to 0.2 bar up to an overpressure of 100 bar, with preference being given for technical reasons to standard pressure—that is, unpressurized operation in relation to external/atmospheric pressure.

The silanes (A)—where appropriate in mixtures with other silanes (S1), silazanes (S2) or siloxanes (S3) are added preferably in liquid form, and in particular are mixed into the silica which is in powder form. The compounds can be admixed in pure form or as solutions in known solvents employed in the art, such as alcohols, for example, more particular alkanols having 1 to 6 carbon atoms, such as methanol, ethanol, or isopropanol, ethers such as diethyl ether, THF, or dioxane, or hydrocarbons such as hexanes or toluene, for example. The concentration in the solution in this case is 5%-95% by weight, preferably 30%-95% by weight, with particular preference 50%-95% by weight.

The admixing takes place preferably by means of nozzle techniques, or comparable techniques, such as effective atomization techniques, such as atomizing in one-fluid nozzles under pressure (preferably 5 to 20 bar), spraying in two-fluid nozzles under pressure (preferably gas and liquid 2-20 bar), very fine division with atomizers or gas/solid exchange assemblies with moving, rotating or static internals which allow homogenous distribution of the silanes with the powder-form silica.

Preferably the silanes (A)—where appropriate in mixtures with other silanes (S1), silazanes (S2) or siloxanes (S3) are added in the form of a very finely divided aerosol, characterized in that the aerosol has a settling velocity of 0.1-20 cm/s.

The loading of the silica and the reaction with the silanes preferably take place with mechanical or gas-supported fluidization. Mechanical fluidization is particularly preferred.

Gas-supported fluidization can be by means of all inert gases which do not react with the silanes, with the silica, and with the silylated silica—that is, which do not lead to secondary reactions, degradation reactions, oxidation events or flame or explosion phenomena—such as, preferably, $N_2$, Ar, other noble gases, $CO_2$, etc. The fluidizing gases are supplied preferably in the region of superficial gas velocities of 0.05 to 5 cm/s, with particular preference of 0.5-2.5 cm/s.

Particular preference is given to the mechanical fluidization which takes place without additional employment of gas beyond that used for inertization, by means of paddle stirrers, anchor stirrers, and other suitable stirring elements.

The reaction takes place at temperatures which are lower than the elimination temperature of the corresponding protective group X of the silane A on the silica surface, preferably at temperatures 0-200° C., preferably 20-100° C., with very particular preference at 20-80° C., and in one specific embodiment at 20-40° C.

The reaction time amounts to 5 min to 48 h, preferably 10 min to 4 h.

Optionally it is possible to add protic solvents, such as liquid or vaporizable alcohols or water; typical alcohols are isopropanol, ethanol, and methanol. It is also possible to add mixtures of the abovementioned protic solvents. It is preferred to add 1% to 50% by weight of protic solvents relative to the silica, with particular preference 5% to 25%. Water is particularly preferred. Optionally it is possible to add acidic catalysts, of acidic nature in the sense of a Lewis acid or of a Brönsted acid, such as hydrogen chloride, or basic catalysts, of basic character in the sense of a Lewis base or a Brönsted base, such as ammonia or amines such as triethylamine. These are preferably added in traces, i.e., at less than 1000 ppm. With particular preference no catalysts are added.

Purification takes place preferably at a temperature lower than the elimination temperature of the corresponding protective group x of the silane A on the silica surface, from 20 to 200° C., preferably 50° C. to 150° C., with particular preference from 50 to 100° C. The purification step is preferably characterized by agitation, with particular preference being given to slow agitation and a low level of mixing. The stirring elements are advantageously set and moved in such a way that, preferably, mixing and fluidization, but not complete vortexing, occur.

The purification step may additionally be characterized by an increased gas input, corresponding to a superficial gas velocity of preferably 0.001 to 10 cm/s, more preferably 0.01 to 1 cm/s. This can be done by means of all inert gases which do not react with the silanes A with the silica, or with the silylated silica—that is, which do not lead to secondary reactions, degradation reactions, oxidation events or flame or explosion phenomena—such as, preferably, $N_2$, Ar, other noble gases, $CO_2$, etc.

In addition it is possible during the silylation or following the purification to employ methods for the mechanical compaction of the silica, such as, for example, press rollers, milling assemblies, such as edge runner mills and such as ball mills, screws or worm mixers, worm compactors, briquetting machines, or compaction by suction withdrawal of the air or gas present, by means of suitable vacuum methods. Additionally, in one particularly preferred procedure, the particle production and particle purification operations may be followed by the use of methods for deagglomerating the silica, such as pinned-disk mills or milling/classifying devices, such as pinned-disk mills, hammer mills, opposed-jet mills, impact mills or milling/classifying devices.

The silylated fumed silica which can be used as particles (P1) is characterized in particular in that it preferably has an average primary-particle size of less than 100 nm, preferably an average primary-particle size of 5 to 50 nm. In one preferred embodiment of the invention these primary particles usually do not exist in isolation, but instead are parts of larger aggregates which have a diameter of 50 to 1000 nm.

In a further preferred embodiment of the invention the particle (P1) used as a starting point in the preparation of the particles (P) comprises particles composed of colloidal silicon oxides or metal oxides, which are generally present in the form of a dispersion of the oxide particles in question, of submicron size, in an aqueous or nonaqueous solvent. The oxides used may, among others, be of the oxides of the metals aluminum, titanium, zirconium, tantalum, tungsten, hafnium or tin. Particular preference is given to using organic solutions of colloidal silica sols.

The preparation of the particles (P) from colloidal silicon oxides or metal oxides may take place by a variety of processes. Preferably, though, it takes place by addition of the silanes (A)—where appropriate in mixtures with other silanes (Si), silazanes (S2) or siloxanes (S3)—to the aqueous or organic sol. This sol is, where appropriate, stabilized acidically, such as by hydrochloric or trifluoroacetic acid, for example, or basically, such as by ammonia, for example. The reaction takes place in general at temperatures of 0-200° C., preferably at 20-80° C., and with particular preference at 20-60° C. The reaction times are typically between 5 min and 48 h, preferably between 1 and 24 h. Optionally it is also possible to add acidic, basic or heavy metal catalysts. They are used preferably in traces <1000 ppm. With particular preference, however, no separate catalysts are added.

Since colloidal silicon oxide or metal oxide sols are often in the form of an aqueous or alcoholic dispersion, it may be advantageous to exchange the solvent or solvents, during or after the preparation of the particles (P), for another solvent or for another solvent mixture. This can be done, for example, by distillatively removing the original solvent, it being possible to add the new solvent or solvent mixture in one step or else in a plurality of steps, before, during or else not until after the distillation. Suitable solvents in this context may be, for example, water, aromatic or aliphatic alcohols, in which case preference is given to aliphatic alcohols, more particularly aliphatic alcohols having 1 to 6 carbon atoms (e.g., methanol, ethanol, n-propanol, iso-propanol, n-butanol, isobutanol, tert-butanol, the various regioisomers of pentanol and hexanol), esters (e.g., ethyl acetate, propyl acetate, butyl acetate, butyl diglycol acetate, methoxypropyl acetate), ketones (e.g., acetone, methyl ethyl ketone), ethers (e.g., diethyl ether, tert-butyl methyl ether, THF), aromatic solvents (toluene, the various regioisomers of xylene, and also mixtures such as solvent naphtha), lactones, (e.g., butyrolactone, etc.) or lactams (e.g., N-methylpyrrolidone). Preference is given here to aprotic solvents and solvent mixtures which are composed exclusively or else at least partly of aprotic solvents. Aprotic solvents have the advantage that any solvent residues which remain in the coating material in the course of curing are inert toward the isocyanate functions released after the elimination of the protective groups. Besides the preparation of a particle dispersion, the isolation of the particles (P) in solid form is also conceivable.

Likewise preferred in connection with the preparation of the particles (P), moreover, is the use of silicone resins of the general formula (IV)

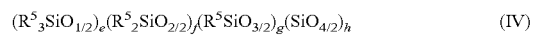

$$(R^5{}_3SiO_{1/2})_e(R^5{}_2SiO_{2/2})_f(R^5SiO_{3/2})_g(SiO_{4/2})_h \qquad (IV)$$

as particles (P1), where
$R^5$ denotes an $OR^1$ function, an OH function, an unsubstituted or halogen-, hydroxyl-, amino-, epoxy-, thiol-, (meth)acryloyl-, or else NCO-substituted hydrocarbon radical having 1-18 carbon atoms,
e denotes a value of greater than or equal to 0,
f denotes a value of greater than or equal to 0,
g denotes a value of greater than or equal to 0,
h denotes a value of greater than or equal to 0, and the sum of e+f+g+h denotes at least a value of at least 1, preferably at least 5.

Preferably at least 70 mol% of all the radicals $R^5$ are methyl, ethyl, isopropyl or phenyl radicals.

In one preferred embodiment, in the case of the silicone resins of the general formula (V), the sum of e+h is at least 90 mol% of the sum of e+f+g+h.

The preparation of the particles (P) of the invention from silicone resins of the general formula (IV) and silanes (A) can take place by way of the processes described above.

A further preferred process for preparing the particles (P) does not start from hydroxyl-containing particles (P1). Instead, the particles (P) are prepared by cohydrolysis of the silanes (A) with other silanes (S4). Silanes (S4) used can be all hydrolyzable silanes and also hydroxysilyl-containing silanes. Siloxanes or silazanes, as well, can also be employed. It is preferred to use silanes of the general formula (III). Typical examples of suitable silanes (S4) are tetraethoxysilane, tetramethoxysilane, methyltrimethoxysilane, phenoltrimethoxysilane, methyltriethoxysilane, phenoltriethoxysilane, dimethyldimethoxysilane, dimethyldiethoxysilane, trimethylmethoxysilane or trimethylethoxysilane. It is of course also possible to use different mixtures of different silanes (S4). Not only mixtures which as well as the silanes (A) contain only silanes (S4) without additional organic functions, but also mixtures which as well as the silanes (A) also contain silanes (S4) without additional organic functions and silanes (S4) with additional organic function, can be used in this context. Where the particles (P) are prepared by cohydrolysis the various silanes can be added jointly and in succession. Another process for preparing the particles (P) involves equilibrating organopolysiloxane resins with the silanes (A). Both the cohydrolysis and the equilibration can be carried out in the presence of catalysts. The processes in principle for the cohydrolysis and equilibration for the preparation of resins have been described in many instances in the literature.

The film-forming resins (L) present alongside the particles (P) in the coating formulations (B1) or (B2) of the invention are preferably composed of hydroxyl-containing prepolymers, with particular preference of hydroxyl-containing polyacrylates or polyesters. Hydroxyl-containing polyacrylates and polyesters of this kind, suitable for coating-material preparation, are sufficiently well known to the skilled worker and have been described in numerous instances in the relevant literature.

Likewise sufficiently well known as state of the art and described in numerous instances in the corresponding literature, are the coating curatives (H) present in the coating formulations (B1) or (B2) of the invention, which preferably comprise melamine-formaldehyde resins or preferably contain protected isocyanate groups which on thermal treatment eliminate a protective group to release an isocyanate function. Particularly preferred among these are curatives (H) which contain protected isocyanate functions. Usually for this purpose use is made of common di- and/or polyisocyanates which have been provided beforehand with the respective protective groups. Suitable protective groups in this context are the same compounds described in connection with the general formula (I) and also in the paragraphs following the general formula (I) as protective groups HX, although the protective groups of the particles (P) and of the curative (H) must—in accordance with the provisions of this invention—be matched to one another. As isocyanates it is possible in principle to use all customary isocyanates, of the kind described in numerous instances in the literature. Common diisocyanates are, for example, diisocyanatodiphenylmethane (MDI), both in the form of crude or technical MDI and in the form of pure 4,4' and/or 2,4' isomers or mixtures thereof, tolylene diisocyanates (TDI) in the form of its various regioisomers, diisocyanatonaphthalene (NDI), isophorone diisocyanate (IPDI), perhydrogenated MDI (H-MDI), tetramethylene diisocyanate, 2-methylpentamethylene diisocyanate, 2,2,4-trimethylhexamethylene diisocyanate, dodecamethylene diisocyanate, 1,4-diisocyantocyclohexane, 1,3-diisocyanato-4-methylcyclohexane or else hexamethylene diisocyanate (HDI). Examples of polyisocyanates are polymeric MDI (P-MDI), triphenylmethane triisocyanate, and also all isocyanurate trimers or biuret trimers of the diisocyanates set out above. In addition it is also possible to use further oligomers of the abovementioned isocyanates with blocked NCO groups. All di- and/or polyisocyanates can be used individually or else in mixtures. Preference is given to using the isocyanurate trimers and biuret trimers of the comparatively UV-stable aliphatic isocyanates, with particular preference to trimers of HDI and IPDI.

The ratio of blocked isocyanate groups of the curative (H) and of the particles (P) with respect to the isocyanate-reactive groups of the film-forming resin (L) is typically chosen from 0.5 to 2, preferably from 0.8 to 1.5, and with particular preference from 1.0 to 1.2.

It is possible, furthermore, for the coating formulations (B1) or (B2) to further comprise the common solvents and also the adjuvants and additives that are typical in coating formulations. As solvents mention may be made, by way of example, of aromatic and aliphatic hydrocarbons, esters such as butyl acetate, butyl diglycol acetate, ethyl acetate or methoxypropyl acetate, ethers, alcohols such as isopropanol or isobutanol, ketones such as acetone or butyl methyl ketone, and heterocycles such as lactones or lactams. A further important solvent is water. Thus water-based coating materials are of heightened interest on account in particular of their low VOC fractions (volatile organic compounds). Additives would include, among others, flow control assistants, surface-active substances, adhesion promoters, light stabilizers such as UV absorbers and/or free-radical scavengers, thixotropic agents, and other solids. To generate the profiles of properties that are desired in each case, both of the coating formulations (B1) or (B2) and of the cured coatings, adjuvants of this kind are generally indispensable. The coating formulations (B1) or (B2) may also include pigments.

In the case of one preferred process, coating formulations (B1) or (B2) of the invention are produced by adding the particles (P), during the mixing operation, in the form of a powder or a dispersion in a suitable solvent. In addition, however, a further process is preferred wherein to start with a masterbatch is produced from the particles (P) and from one or more coating-material components, the master-batch having particle concentrations >15%, preferably >25%, and with particular preference >35%. In the context of the preparation of the coating formulations (B1) or (B2) of the invention, this masterbatch is then mixed with the other coating-material components. Where the masterbatch is prepared starting from a particle dispersion, it may be advantageous if the solvent of the particle dispersion is removed in the course of the preparation of the masterbatch, via a distillation step, for example, or else replaced by a different solvent or solvent mixture.

The resulting coating formulations (B1) or (B2) can be used to coat any desired substrates for the purpose of enhancing the scratch resistance, abrasion resistance or chemical resistance. Preferred substrates are plastics such as polycarbonate, polybutylene terephthalate, polymethyl methacrylate, polystyrene or polyvinyl chloride, and other coatings applied in a preceding step.

With particular preference the coating formulations (B1) or (B2) can be used as scratch-resistant clearcoat or topcoat materials, more particularly in the vehicle industry. The coating formulations can be applied by any desired methods such as immersion, spraying and pouring methods. Also possible is application by a wet in wet process. Curing takes place by heating under the conditions necessary for blocked isocyanates, and can of course be accelerated through the addition of catalysts.

All of the symbols in the above formulae have their definitions in each case independently of one another. In all formulae the silicon atom is tetravalent.

Unless indicated otherwise, all quantity and percentage figures are based on the weight, all pressures are 0.10 MPa (abs.), and all temperatures are 20° C.

EXAMPLES

Synthesis Example 1

Preparation of an Alkoxysilane with Butane Oxime-Protected Isocyanate Groups (Silane 1).

74.0 g of 2-butane oxime and 0.12 g of Borchi® catalyst (catalyst VP 0244 from Borchers GmbH) are initially mixed and heated to 80° C. Over the course of 1 h 150.00 g of isocyanatomethyltrimethoxysilane are added dropwise and the mixture is stirred at 80° C. for 1 h. $^1$H NMR and IR spectroscopy show that the isocyanatosilane has been fully reacted.

Synthesis Example 2

Preparation of an Alkoxysilane with Diisopropylamine-Protected Isocyanate Groups (Silane 2).

86.0 g of diisopropylamine and 0.12 g of Borchi® catalyst (catalyst VP 0244 from Borchers GmbH) are initially mixed and heated to 80° C. Over the course of 1 h 150.00 g of isocyanatomethyltrimethoxysilane are added dropwise and the mixture is stirred at 60° C. for 1 h. $^1$H NMR and IR spectroscopy show that the isocyanatosilane has been fully reacted.

Synthesis Example 3

Preparation of an Alkoxysilane with Diisopropylamine-Protected Isocyanate Groups (Silane 3).

74.5 g of diisopropylamine and 0.12 g of Borchi® catalyst (catalyst VP 0244 from Borchers GmbH) are initially mixed and heated to 80° C. Over the course of 1 h 150.00 g of 3-isocyanatopropyltrimethoxysilane are added dropwise and the mixture is stirred at 60° C. for 1 h. $^1$H NMR and IR spectroscopy show that the isocyanatosilane has been fully reacted.

Synthesis Example 4

Preparation of Fumed Silica Modified with Butane Oxime-Blocked Isocyanate Groups At a temperature of 25° C. under $N_2$ inert gas 100 g of fumed hydrophilic silica, with a moisture content of less than 1%, an HCl content of less than 100 ppm, and a specific surface area of 300 m$^2$/g (measured by the BET method in accordance with DIN 66131 and 66132) (available under the name WACKER HDK® T30 from Wacker-Chemie GmbH, Munich, D), are admixed via a one-fluid nozzle (pressure: 5 bar) with 70 g of the butane oxime-protected isocyanatosilane described in Synthesis Example 1 (silane 1) and 10 ml of water, in very finely divided form. The silica thus loaded is subsequently fluidized under $N_2$ for 2 h at a temperature of 25° C. and then reacted under $N_2$ at 80° C. for 2 h in a 100 l drying cabinet. This gives a white silica powder (KP-1) with a homogeneous layer of silylating agent.

Synthesis Example 5

Preparation of Fumed Silica Modified with Diisopropylamine-Blocked Isocyanate Groups At a temperature of 25° C. under $N_2$ inert gas 100 g of fumed hydrophilic silica, with a moisture content of less than 1%, an HCl content of less than 100 ppm, and a specific surface area of 300 m$^2$/g (measured by the BET method in accordance with DIN 66131 and 66132) (available under the name WACKER HDK T30 from Wacker-Chemie GmbH, Munich, D), are admixed via a one-fluid nozzle (pressure: 5 bar) with 70 g of the diisopropylamine-protected isocyanatosilane described in Synthesis Example 2 (silane 2) and 10 ml of water, in very finely divided form. The silica thus loaded is subsequently fluidized under $N_2$ for 2 h at a temperature of 25° C. and then reacted under $N_2$ at 80° C. for 2 h in a 100 l drying cabinet. This gives a white silica powder (KP-2) with a homogeneous layer of silylating agent.

Synthesis Example 6

Preparation of SiO$_2$ Nanosol Particles Modified with Butane Oxime-Blocked Isocyanate Groups 1.33 g of the butane oxime-protected isocyanatosilane (silane 1) prepared in accordance with Synthesis Example 1 are dissolved in 1 g of isopropanol. Then, over the course of 30 min, 20 g of an SiO$_2$ organosol (IPA-ST from Nissan Chemicals, 30% by weight SiO$_2$, 12 nm average particle diameter) are added dropwise and the pH is adjusted to 3.5 by addition of trifluoroacetic acid. The dispersion obtained is stirred at 60° C. for 3 h and then at room temperature for 18 h. Thereafter 18.0 g of methoxypropyl acetate are added. The mixture is stirred for a few minutes and then a major fraction of the isopropanol is distilled off at 70° C. Distillation is continued until the nanoparticle sol has been concentrated to 28.0 g. This gives a dispersion having a solids content of 26.2%. The SiO$_2$ content is 21.4%, and the amount of protected isocyanate groups in the dispersion is 0.18 mmol/g. The dispersion is slightly turbid and exhibits a Tyndall effect.

Synthesis Example 7

Preparation of SiO$_2$ Nanosol Particles Modified with Diisopropylamine-Blocked Isocyanate Groups 1.40 g of the diisopropylamine-protected isocyanatosilane (silane 2) prepared in accordance with Synthesis Example 2 are dissolved in 1 g of isopropanol. Then, over the course of 30 min, 20 g of an SiO$_2$ organosol (IPA-ST from Nissan Chemicals, 30% by weight SiO$_2$, 12 nm average particle diameter) are added dropwise and the pH is adjusted to 3.5 by addition of trifluoroacetic acid. The dispersion obtained is stirred at 60° C. for 3 h and then at room temperature for 18 h. Thereafter 18.1 g of methoxypropyl acetate are added. The mixture is stirred for a few minutes and then a major fraction of the isopropanol is distilled off at 70° C. Distillation is continued until the nanoparticle sol has been concentrated to 29.4 g. This gives a dispersion having a solids content of 25.5%. The SiO$_2$ content is 20.8%, and the amount of protected isocyanate groups in the dispersion is 0.17 mmol/g. The dispersion is slightly turbid and exhibits a Tyndall effect.

This gives a dispersion having a solids content of 25.5%. The SiO$_2$ content is 20.8%, and the amount of protected isocyanate groups in the dispersion is 0.17 mmol/g. The dispersion is slightly turbid and exhibits a Tyndall effect.

Synthesis Example 8

Preparation of SiO$_2$ Nanosol Particles Modified with Diisopropylamine-Blocked Isocyanate Groups 1.54 g of the diisopropylamine-protected isocyanatosilane (silane 3) prepared in accordance with Synthesis Example 3 are initially taken. Then, over the course of 30 min, 20 g of an SiO$_2$ organosol (IPA-ST from Nissan Chemicals, 30% by weight SiO$_2$, 12 nm average particle diameter) are added dropwise and the pH is adjusted to 3.0 by addition of trifluoroacetic acid. The dispersion obtained is stirred at 60° C. for 3 h and then at room temperature for 24 h.

The SiO$_2$ content is 27.9%, and the amount of protected isocyanate groups in the dispersion is 0.23 mmol/g. The dispersion is slightly turbid and exhibits a Tyndall effect.

Example 1

Preparation of a One-Component Coating Formulation Comprising a Curative Having Butane Oxime-Blocked Isocyanate Groups and a Fumed Silica Modified by Diisopropylamine-Blocked Isocyanate Groups To prepare a coating formulation of the invention, 8.56 g of Desmophen® A 365 BA/X from Bayer (acrylate-based paint polyol having a hydroxyl group content of 1.71 mmol OH/g)

are mixed with 6.33 g of Desmodur® BL 3175 SN from Bayer (butane oxime-blocked polyisocyanate, blocked NCO content approximately 11%). This corresponds to a molar ratio of protected isocyanate functions to hydroxyl groups of 1.1:1. Additionally, 0.05 g of a 50% strength dibutyltin dilaurate solution (in methyl ethyl ketone) and 0.01 g of ADDID® 100 from TEGO AG (flow control assistant based on polydimethylsiloxane) and also 3.15 g of methyl ethyl ketone are mixed in, giving a coating formulation with a solids content of approximately 50%. Incorporated into the resulting mixture by means of a dissolver are 1.8 g of the fumed silica obtained from Synthesis Example 5, modified with diisopropylamine-blocked isocyanate groups (KP-2), giving a clearcoating formulation.

Comparative Example 1

Noninventive

Preparation of a One-Component Coating Formulation Comprising a Curative Having Butane Oxime-Blocked Isocyanate Groups and a Fumed Silica Modified by Butane Oxime-Blocked Isocyanate Groups To prepare a comparative coating, 8.56 g of Desmophen® A 365 BA/X from Bayer (acrylate-based paint polyol having a hydroxyl group content of 1.71 mmol/g) are mixed with 6.33 g of Desmodur® BL 3175 SN from Bayer (butane oxime-blocked polyisocyanate, blocked NCO content approximately 11%). This corresponds to a molar ratio of protected isocyanate functions to hydroxyl groups of 1.1:1. Additionally, 0.05 g of a 50% strength dibutyltin dilaurate solution (in methyl ethyl ketone) and 0.01 g of ADDID® 100 from TEGO AG (flow control assistant based on polydimethylsiloxane) and also 3.15 g of methyl ethyl ketone are mixed in, giving a coating formulation with a solids content of approximately 50%.

Incorporated into the resulting mixture by means of a dissolver are 1.8 g of the fumed silica obtained from Synthesis Example 4, modified with butane oxime-blocked isocyanate groups (KP-1), giving a clearcoating formulation.

Production and Evaluation of Coating Films from Example 1 and Comparative Example 1

The coating formulations from Example 1 and from Comparative Example 1 are each knife-coated onto a glass plate, using a Coatmaster® 509 MC film-drawing device from Erichsen, with a knife having a slot height of 100 μm. The coating films obtained are then dried in a forced-air drying cabinet at 160° C. for 30 minutes. Both from the coating formulations of the example and also from the comparative example, coatings are obtained which are visually flawless and smooth. The gloss of the coatings is determined using a Micro gloss 20° gloss meter from Byk, and is found to be approximately 144 gloss units for the coating formulation from Example 1, and approximately 131 gloss units for the coating formulation from Comparative Example 1.

The scratch resistance of the cured coating films thus produced is determined using a Peter-Dahn abrasion-testing instrument. For this purpose a Scotch Brite® 2297 abrasive nonwoven with an area of 45×45 mm is loaded with a weight of 500 g and used for scratching with 50 strokes. Both before the beginning and after the end of the scratch tests, the gloss of the respective coating is measured using a Micro gloss 20° gloss meter from Byk. As a measure of the scratch resistance of the respective coating, the loss of gloss in comparison to the initial value was ascertained:

TABLE 1

| Loss of gloss in the Peter-Dahn scratch test | |
|---|---|
| Coating sample | Loss of gloss |
| Example 1 | 22% |
| Comparative Example 1* | 55% |

*noninventive

Example 2

Preparation of a One-Component Coating Formulation Comprising a Curative Having Butane Oxime-Blocked Isocyanate Groups and SiO$_2$ Nanosol Particles Modified with Diisopropylamine-Blocked Isocyanate Groups To produce a coating formulation of the invention, 4.50 g of an acrylate-based paint polyol having a solids content of 52.4% by weight (solvents: solvent naphtha, methoxypropyl acetate (10:1)), a hydroxyl group content of 1.46 mmol/g resin solution, and an acid number of 10-15 mg KOH/g are mixed with 2.69 g of Desmodur® BL 3175 SN from Bayer (butane oxime-blocked polyisocyanate, blocked NCO content of 2.64 mmol/g). Subsequently 0.76 g of the dispersion prepared according to Synthesis Example 7 is added, containing SiO$_2$ nanosol particles which have been modified with diisopropylamine-blocked isocyanate groups. This corresponds to a molar ratio of protected isocyanate functions to hydroxyl groups of 1.1:1. In addition, 0.01 g of a dibutyltin dilaurate and 0.03 g of a 10% strength solution of ADDID® 100 from TEGO AG (flow control assistant based on polydimethylsiloxane) in isopropanol are mixed in, giving a coating formulation with a solids content of approximately 50%. This mixture, which initially is still slightly turbid, is stirred at room temperature for 48 h, giving a clear coating formulation.

Example 3

Preparation of a One-Component Coating Formulation Comprising a Curative Having Butane Oxime-Blocked Isocyanate Groups and SiO$_2$ Nanosol Particles Modified with Diisopropylamine-Blocked Isocyanate Groups To produce a coating formulation of the invention, 4.50 g of an acrylate-based paint polyol having a solids content of 52.4% by weight (solvents: solvent naphtha, methoxypropyl acetate (10:1)), a hydroxyl group content of 1.46 mmol/g, and an acid number of 10-15 mg KOH/g are mixed with 2.60 g of Desmodur® BL 3175 SN from Bayer (butane oxime-blocked polyisocyanate, blocked NCO content of 2.64 mmol/g). Subsequently 2.11 g of the dispersion prepared according to Synthesis Example 7 are added, containing SiO$_2$ nanosol particles which have been modified with diisopropylamine-blocked isocyanate groups. This corresponds to a molar ratio of protected isocyanate functions to hydroxyl groups of 1.1:1. In addition, 0.01 g of a dibutyltin dilaurate and 0.03 g of a 10% strength solution of ADDID® 100 from TEGO AG (flow control assistant based on polydimethylsiloxane) in isopropanol are mixed in, giving a coating formulation with a solids content of approximately 50%. This mixture, which initially is still slightly turbid, is stirred at room temperature for 48 h, giving a clear coating formulation.

Example 4

Preparation of a One-Component Coating Formulation Comprising a Curative Having Butane Oxime-Blocked Isocyanate Groups and SiO$_2$ Nanosol Particles Modified with Diisopropylamine-Blocked Isocyanate Groups To produce a coating formulation of the invention, 4.50 g of an acrylate-based paint polyol having a solids content of 52.4% by weight (solvents: solvent naphtha, methoxypropyl acetate (10:1)), a hydroxyl group content of 1.46 mmol/g, and an acid number of 10-15 mg KOH/g are mixed with 2.69 g of Desmodur® BL 3175 SN from Bayer (butane oxime-blocked polyisocyanate, blocked NCO content of 2.64 mmol/g). Subsequently 0.57 g of the dispersion prepared according to Synthesis Example 8 is added, containing SiO$_2$ nanosol particles which have been modified with diisopropylamine-blocked isocyanate groups. This corresponds to a molar ratio of protected isocyanate functions to hydroxyl groups of 1.1:1. In addition, 0.05 g of a 50% strength dibutyltin dilaurate solution (in methyl ethyl ketone) and 0.01 g of ADDID® 100 from TEGO AG (flow control assistant based on polydimethylsiloxane) are mixed in, giving a coating formulation with a solids content of approximately 50%. This mixture, which initially is still slightly turbid, is stirred at room temperature for 24 h, giving a clear coating formulation.

Comparative Example 2

Noninventive

Preparation of a One-Component Coating Formulation Comprising a Curative Having Butane Oxime-Blocked Isocyanate Groups and SiO$_2$ Nanosol Particles Modified with Butane Oxime-Blocked Isocyanate Groups To produce a coating, 4.50 g of an acrylate-based paint polyol having a solids content of 52.4% by weight (solvents: solvent naphtha, methoxypropyl acetate (10:1)), a hydroxyl group content of 1.46 mmol/g, and an acid number of 10-15 mg KOH/g are mixed with 2.69 g of Desmodur® BL 3175 SN from Bayer (butane oxime-blocked polyisocyanate, blocked NCO content of 2.64 mmol/g). Subsequently 0.75 g of the dispersion prepared according to Synthesis Example 6 is added, containing SiO$_2$ nanosol particles which have been modified with butane oxime-blocked isocyanate groups. This corresponds to a molar ratio of protected isocyanate functions to hydroxyl groups of 1.1:1. In addition, 0.05 g of a 50% strength dibutyltin dilaurate solution (in methyl ethyl ketone) and 0.01 g of ADDID® 100 from TEGO AG (flow control assistant based on polydimethylsiloxane) are mixed in, giving a coating formulation with a solids content of approximately 50%. This mixture, which initially is still slightly turbid, is stirred at room temperature for 24 h, giving a clear coating formulation.

Production and Evaluation of Coating Films from Examples 2-4 and Comparative Example 2.

The coating formulations from Examples 2-4 and from Comparative Example 2 are each knife-coated onto a glass plate, using a Coatmaster® 509 MC film-drawing device from Erichsen, with a knife having a slot height of 120 μm. The coating films obtained are then dried in a forced-air drying cabinet at 70° C. for 30 minutes and then at 150° C. for 30 minutes. Both from the coating formulations of the examples and also from the comparative examples, coatings are obtained which are visually flawless and smooth. The gloss of the coatings is determined using a Micro gloss 20° gloss meter from Byk, and is between 160 and 164 gloss units for all of the coating formulations from Example 2-4 and from Comparative Examples 1 and 2.

The scratch resistance of the cured coating films thus produced is determined using a Peter-Dahn abrasion-testing instrument. For this purpose a Scotch Brite® 2297 abrasive nonwoven with an area of 45×45 mm is loaded with a weight of 500 g and used for scratching the coating samples with a total of 40 strokes. Both before the beginning and after the end of the scratch tests, the gloss of the respective coating is measured using a Micro gloss 20° gloss meter from Byk. As a measure of the scratch resistance of the respective coating, the loss of gloss in comparison to the initial value was ascertained:

TABLE 2

Loss of gloss in the Peter-Dahn scratch test

| Coating sample | Loss of gloss |
|---|---|
| Example 2 | 28% |
| Example 3 | 24% |
| Example 4 | 30% |
| Comparative Example 2* | 54% |

*noninventive

The invention claimed is:

1. A coating formulation having a solids fraction, comprising components:
    a) 20-90% by weight of a film-forming resin containing reactive groups,
    b) 1-90% by weight, based on the solids fraction, of a coating curative, possessing reactive functional groups which cure at elevated temperature by reacting with the reactive groups of the film-forming resin,
and in addition to components a) and b),
    c) 0.1-40% by weight, based on the solids fraction, of particles having a core of metal oxides, silicon oxides, mixed metal/silicon oxides, silicone resins, or a combination thereof, the particles having on their surface at least one protected isocyanate group which upon cure eliminates a protective group to release an isocyanate functionality, more than 70% of the protected isocyanate groups bearing protective groups whose elimination temperature is below the temperature of the reaction of the functional groups of the film-forming resin with those of the curative, and
    d) 0-90% by weight, based on the overall coating formulation, of a solvent or a solvent mixture
wherein the percents by weight are based on the total weight of the solids fraction.

2. A coating formulation of claim 1, comprising:
    a) 20-90% by weight, based on the solids fraction, of a hydroxyl-functional film-forming resin,
    b) 1-90% by weight, based on the solids fraction, of a coating curative which contains protected isocyanate groups which at elevated temperature eliminate a protective group to release an isocyanate functionality, and in addition to components a) and b)
  c) 0.1-40% by weight, based on the solids fraction, of particles comprising a core comprising metal oxides, silicon oxides, mixed metal/silicon oxides, silicone resins, or a combination thereof, the particles possessing on their surface at least one protected isocyanate group which eliminate a protective group at elevated temperature to release an isocyanate functionality, more than 70% of the protected isocyanate groups bearing protective groups which have a lower elimination temperature than at least 55% of the protective groups of the protected isocyanate groups of the curative, and
  d) 0-90% by weight, based on the overall coating formulation, of at least one solvent mixture.

3. A coating formulation of claim 1, comprising:
  a) 20-90% by weight, based on the solids fraction, of a film-forming resin containing reactive groups,
  b) 1-90% by weight, based on the solids fraction, of a coating curative, possessing reactive functions which react at elevated temperature with the reactive groups of the film-forming resin,
and in addition to components a) and b)
  c) 0.1-40% by weight, based on the solids fraction, of particles (P) which comprise a core of metal oxides, silicon oxides, mixed metal/silicone oxides, silicone resins or a combination thereof, the particles possessing on their surface at least one protected isocyanate group which at elevated temperature eliminate a protective group to release an isocyanate functionality, more than 70% of the protected isocyanate groups of the particles bearing protective groups which have a lower elimination temperature than butane oxime protective groups, and
  d) 0-90% by weight, based on the overall coating formulation, of at least one solvent.

4. A coating formulation of claim 1, comprising:
  a) 20-90% by weight, based on the solids fraction, of a hydroxyl-functional film-forming resin,
  b) 1-90% by weight, based on the solids fraction, of a coating curative which contains protected isocyanate groups which eliminate a protective group at elevated temperature to release an isocyanate functionality,
and in addition to components a) and b)
  c) 0.1-40% by weight, based on the solids fraction, of particles comprising a core comprising metal oxides, silicon oxides, mixed metal/silicon oxides, silicone resins, or a combination thereof, the particles possessing on their surface at least one protected isocyanate group which eliminates a protective group at elevated temperature to release an isocyanate functionality, more than 70% of the protected isocyanate groups of the particles bearing protective groups which have a lower elimination temperature than butane oxime protective groups,
  d) 0-90% by weight, based on the overall coating formulation (B2), of at least one solvent.

5. A coating formulation of claim 1, comprising components:
  a) 30-80% by weight, based on the solids fraction, of a film-forming resin,
  b) 10-60% by weight, based on the solids fraction, of a coating curative,
  c) 0.5-30% by weight, based on the solids fraction, of particles, and
  d) 0-80% by weight, based on the overall coating formulation, of one or more solvents.

6. A coating formulation of claim 1, wherein the particles are obtained by reacting metal oxide, silicon oxide, mixed metal/silicon oxides, and/or silicone resin particles, said particles possessing free hydroxyl functionality, with organosilanes which
  possess at least one hydrolyzable silyl functionality and/or at least one hydroxysilyl group, and which contain at least one protected isocyanate functionality.

7. A coating formulation of claim 6, wherein at least one organosilane has the formula (I)

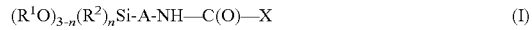

$$(R^1O)_{3-n}(R^2)_n\text{Si-A-NH—C(O)—X} \qquad (I)$$

where
  $R^1$ each individually is hydrogen, an alkyl, cycloalkyl, or aryl radical having to 6 C atoms, the carbon chain optionally interrupted by nonadjacent oxygen, sulfur or $NR^3$ groups,
  $R^2$ each individually is an alkyl, cycloalkyl, aryl or arylalkyl radical having up to 12 C atoms, the carbon chain optionally interrupted by nonadjacent oxygen, sulfur or $NR^3$ groups,
  $R^3$ each individually is hydrogen, an alkyl, cycloalkyl, aryl, arylalkyl, aminoalkyl or aspartate ester radical,
  X denotes a protective group which is eliminated at temperatures of 60 to 300° C. in the form of HX, and releases an isocyanate functionality,
  A is a difunctional alkyl, cycloalkyl or aryl radical having up to 10 carbon atoms, and
  n is 0, 1 or 2.

8. A coating formulation of claim 6, wherein at least one organosilane has the formula (II)

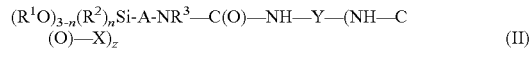

$$(R^1O)_{3-n}(R^2)_n\text{Si-A-NR}^3\text{—C(O)—NH—Y—(NH—C(O)—X)}_z \qquad (II)$$

where
  $R^1$ each individually is hydrogen, an alkyl, cycloalkyl, or aryl radical having to 6 C atoms, the carbon chain optionally interrupted by nonadjacent oxygen, sulfur or $NR^3$ groups,
  $R^2$ each individually is an alkyl, cycloalkyl, aryl or arylalkyl radical having up to 12 C atoms, the carbon chain optionally interrupted by nonadjacent oxygen, sulfur or $NR^3$ groups,
  $R^3$ each individually is hydrogen, an alkyl, cycloalkyl, aryl, arylalkyl, aminoalkyl or aspartate ester radical,
  X denotes a protective group which is eliminated at temperatures of 60 to 300° C. in the form of HX, and releases an isocyanate functionality,
  A is a difunctional alkyl, cycloalkyl or aryl radical having up to 10 carbon atoms, and
  n is 0, 1 or 2,
  Y is a (z+1)-functional aliphatic or aromatic radical, and
  z is a number from 1-4.

9. A coating formulations of claim 6, wherein at least one organosilane has the formula (II)

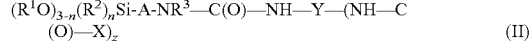

$$(R^1O)_{3-n}(R^2)_n\text{Si-A-NR}^3\text{—C(O)—NH—Y—(NH—C(O)—X)}_z \qquad (II)$$

where
  $R^1$ each individually is hydrogen, an alkyl, cycloalkyl, or aryl radical having to 6 C atoms, the carbon chain optionally interrupted by nonadjacent oxygen, sulfur or $NR^3$ groups,
  $R^2$ each individually is an alkyl, cycloalkyl, aryl or arylalkyl radical having up to 12 C atoms, the carbon chain optionally interrupted by nonadjacent oxygen, sulfur or $NR^3$ groups,
  $R^3$ each individually is hydrogen, an alkyl, cycloalkyl, aryl, arylalkyl, aminoalkyl or aspartate ester radical, X denotes a protective group which is eliminated at temperatures of 60 to 300° C. in the form of HX, and releases an isocyanate functionality, A is a difunctional alkyl, cycloalkyl or aryl radical having up to 10 carbon atoms, and n is 0, 1 or 2, Y is a (z+1)-functional aliphatic or aromatic radical, and z is a number 1 or 2.

10. A coating formulation of claim 1, wherein the particles are selected from the group consisting of aluminum oxides, aluminum mixed oxides with other metals and/or with silicon, titanium oxides, zirconium oxides, iron oxides, silicon oxides, silicon oxide compounds where some valences of the silicon bear organic radicals, and mixtures thereof.

11. The coating formulation of claim 1, wherein at least one particle comprises particles of silicone resins of the formula (IV)

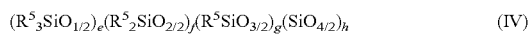

where $R^5$ each individually is an $OR^1$ functionality, an OH functionality, an unsubstituted or halogen-, hydroxyl-, amino-, epoxy-, thiol-, (meth)acryloyl-, or an NCO-substituted hydrocarbon radical having 1-18 carbon atoms, e is greater than or equal to 0, f is greater than or equal to 0, g is greater than or equal to 0, h is greater than or equal to 0, and the sum of e+f+g+h is at least 1.

12. The coating formulation of claim 1, wherein at least one particle comprises particles of silicone resins of the formula (IV)

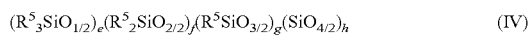

where $R^5$ each individually is an $OR^1$ functionality, an OH functionality, an unsubstituted or halogen-, hydroxyl-, amino-, epoxy-, thiol-, (meth)acryloyl-, or an NCO-substituted hydrocarbon radical having 1-18 carbon atoms, e is greater than or equal to 0, f is greater than or equal to 0, g is greater than or equal to 0, h is greater than or equal to 0, and the sum of e+f+g+h is at least 1 to 5.

13. The coating formulation of claim 1, wherein the reactive groups of the film forming resin are isocyanate-reactive groups, and the ratio of the blocked isocyanate groups of the curative and the particles to the isocyanate-reactive groups of the film-forming resin is 0.5 to 2.

14. A scratch-resistant clearcoat or topcoat material comprising the coating formulation of claim 1.

15. The coating formulation of claim 1, which is a one-component coating composition.

16. The coating formulation of claim 2, which is a one-component coating composition.

17. The coating formulation of claim 2, wherein the particles are obtained by reacting metal oxide, silicon oxide, mixed metal/silicon oxides, and/or silicone resin particles, said particles possessing free hydroxyl functionality, with organosilanes which possess at least one hydrolyzable silyl functionality and/or at least one hydroxysilyl group, and which contain at least one protected isocyanate functionality.

18. A coating formulation of claim 17, wherein at least one organosilane has the formula (I)

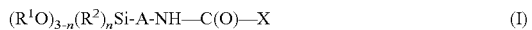

where $R^1$ each individually is hydrogen, an alkyl, cycloalkyl, or aryl radical having to 6 C atoms, the carbon chain optionally interrupted by nonadjacent oxygen, sulfur or $NR^3$ groups, $R^2$ each individually is an alkyl, cycloalkyl, aryl or arylalkyl radical having up to 12 C atoms, the carbon chain optionally interrupted by nonadjacent oxygen, sulfur or $NR^3$ groups, $R^3$ each individually is hydrogen, an alkyl, cycloalkyl, aryl, arylalkyl, aminoalkyl or aspartate ester radical, X denotes a protective group which is eliminated at temperatures of 60 to 300° C. in the form of HX, and releases an isocyanate functionality, A is a difunctional alkyl, cycloalkyl or aryl radical having up to 10 carbon atoms, and n is 0, 1 or 2.

19. A coating formulation of claim 17, wherein at least one organosilane has the formula (II)

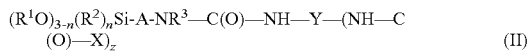

where $R^1$ each individually is hydrogen, an alkyl, cycloalkyl, or aryl radical having to 6 C atoms, the carbon chain optionally interrupted by nonadjacent oxygen, sulfur or $NR^3$ groups, $R^2$ each individually is an alkyl, cycloalkyl, aryl or arylalkyl radical having up to 12 C atoms, the carbon chain optionally interrupted by nonadjacent oxygen, sulfur or $NR^3$ groups, $R^3$ each individually is hydrogen, an alkyl, cycloalkyl, aryl, arylalkyl, aminoalkyl or aspartate ester radical, X denotes a protective group which is eliminated at temperatures of 60 to 300° C. in the form of HX, and releases an isocyanate functionality, A is a difunctional alkyl, cycloalkyl or aryl radical having up to 10 carbon atoms, and n is 0, 1 or 2, Y is a (z+1)-functional aliphatic or aromatic radical, and z is a number from 1-4.

20. The coating composition of claim 1, wherein the coating curative b) comprises a melamine-formaldehyde resin.

21. The coating formulation of claim 2, when the coating curative comprises a protected isocyanate selected from the group consisting of MDI, TDI, NDI, IPDI, H-MDI, tetramethylene diisocyanate, 2-methylpentamethylene diisocyanate, 2,2,4-trimethylhexamethylene diisocyanate, dodecamethylene diisocyanate, 1,4-diisocyanatocyclohexane, 1,3-diisocyanato-4-methylcyclohexane, HDI, p-MDI, triphenylmethane triisocyanate, isocyanurate trimers thereof, biuret dimers thereof, and mixtures thereof.

22. The coating formulation of claim 2, wherein the coating curative consists of protected IPDI, protected HDI, or mixtures thereof.

* * * * *